PROCESS FOR PRODUCING TAPE-SHAPED SEMICONDUCTOR BODIES

Filed Oct. 19, 1965

United States Patent Office 3,293,002

Patented Dec. 20, 1966

3,293,002
PROCESS FOR PRODUCING TAPE-SHAPED SEMICONDUCTOR BODIES

Werner Spielmann, Dachtel, and Walter Heywang, Munich, Germany, assignors to Siemens & Halske Aktiengesellschaft, Berlin, Germany and Munich, Germany, a German corporation Filed Oct. 19, 1965, Ser. No. 505,121
3 Claims. (Cl. 23—301)

This is a continuation-in-part of our copending application Serial No. 186,423, filed April 10, 1962, which has the German priority date of April 11, 1961.

Our invention relates to the production of long tape-shaped semiconductor bodies from a melt of the semiconductor material supercooled below the melting point, according to which a semiconductor body is dendritically grown onto a crystal seed and is pulled out of the melt.

In a more particular aspect, our invention is related to the process according to copending application of W. Spielmann et al., Serial No. 139,400, filed September 20, 1961, which is assigned to the assignee of the present invention. According to that process, a melt of silicon, germanium or other similar conductor material is supported on top of a carrier body of the same material and is kept above the melting point of the material in the region adjacent to the solid material of the carrier body while being supercooled in the immediate vicinity of the location where the dendrite is being pulled from the melt.

As a rule, the tape-shaped semiconductor bodies pulled from a locally supercooled melt are twin-dendrites regularly grown together in face-to-face relation with a rather irregular and uncontrollable growth of crystalline material between the two component bodies.

It is an object of our invention to provide an improved method of producing dendritic semiconductor tapes or strips from a locally supercooled melt so as to avoid the occurrence of twin growth and thereby securing better uniformity and controllability of the characteristics, particularly the electronically essential properties, of the product.

To this end, and in accordance with one of the features of our invention, we produce and maintain in the less heated, supercooled region of the melt a temperature gradient of such a course that the temperature of the melt decreases from the interior of the melt toward its surface.

This and more specific features of our invention, as well as further objects and advantages will be described and explained in the following with reference to the accompanying drawings in which:

FIGS. 5 to 7 are explanatory of the copending invention Serial No. 139,400, showing in FIGS. 5 and 6 a schematic diagram of the temperature distribution in a melt as occuring when performing the method according to the present invention, and in FIG. 7 the temperature distribution in the supercooled region from which the dendrite is being pulled.

The same reference numerals are used in all illustrations for corresponding items respectively.

Figures 1, 2, 3, 4, 5, 6, 7, 8, 9, 10, 11, 12:
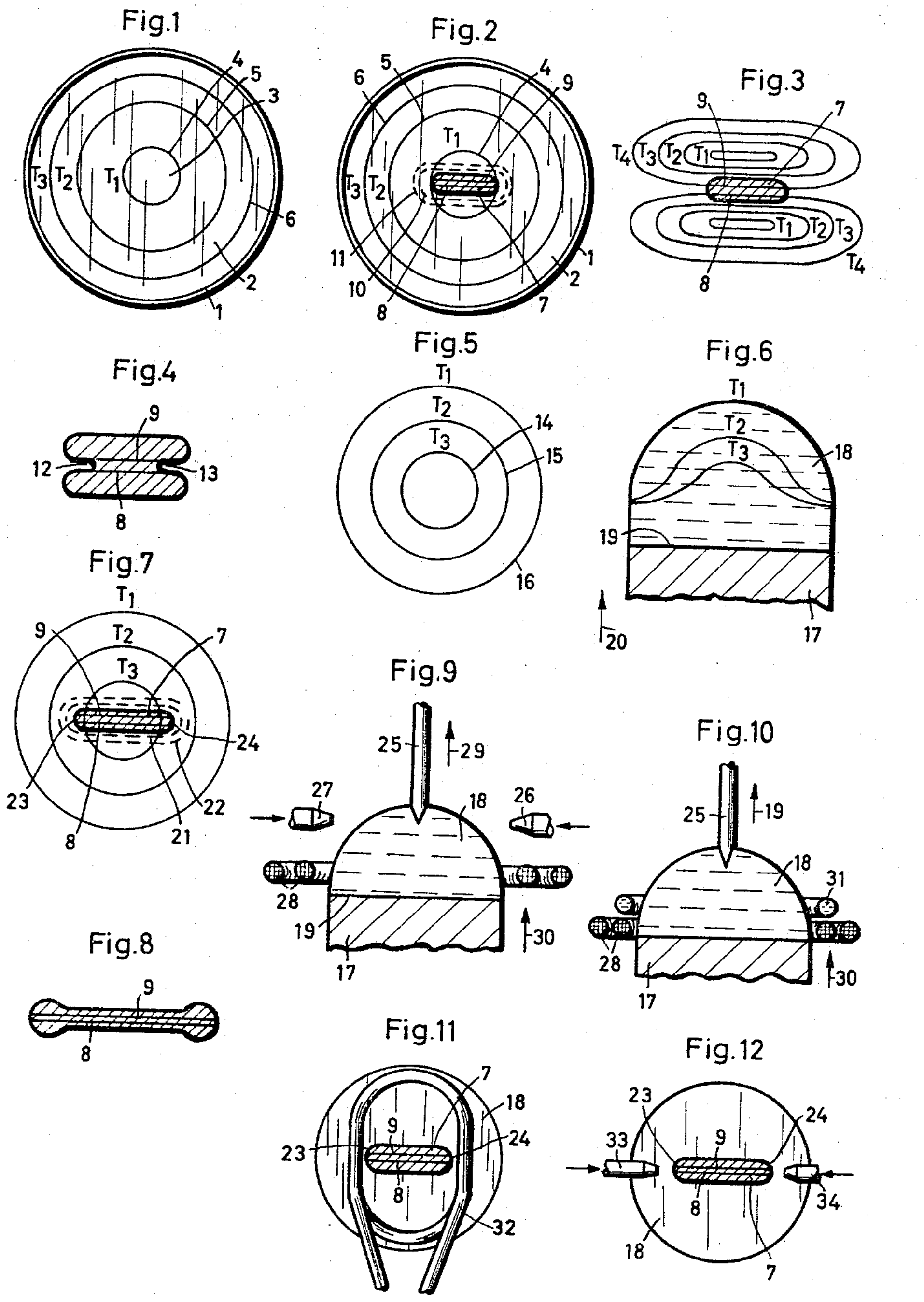
FIGS. 1 to 7 are background explanation, showing in FIGS. 1 and 2 the temperature distribution or isotherms in a crucible from which a dendritic crystalline tape is being pulled, in FIG. 3 the temperature distribution in the supercooled region at the pulling locality of the dendrite, and in FIG. 4 a cross section through the resulting dendrite.
FIG. 8 shows schematically, and by way of example, a cross section of a dendritic tape produced according to the invention.
FIGS. 9 and 10 illustrate two respective embodiments of devices for performing the process according to the copending invention, each representing a vertical sectional view. The embodiment of FIG. 9 when modified as described below pertains to the present invention.
FIGS. 11 and 12 illustrate two embodiments respectively of the present invention by respective top views.

When dendrites are being pulled from a melt, located for example in a crucible, a temperature distribution as schematically exemplified in FIG. 1 results. A crucible of circular cross section seen from above is shown in FIG. 1. The melt 2 in the crucible 1 is heated, for example by inductance heating, to a temperature above the melting point. After immersing the crystal seed, the melt is supercooled in the vicinity of the crystal seed, and hence in the region denoted by 3. The isotherms denoted in FIG. 1 by 4, 5 and 6 correspond to respective temperature $T_1$, $T_2$ and $T_3$ whose relation is $T_1<T_2<T_3$, wherein $T_1$ is a temperature below the melting point of the semiconductor material. Due to supercooling of the melt in the region around the crystal seed, solid semiconductor material from the melt grows onto the crystal seed. The crystallization of the semiconductor material liberates heat of crystallization.

FIG. 2 shows the isotherms of the melt in the crucible and the isotherms 10 and 11 caused by the liberated heat of crystallization. These isotherms surround seed crystal 7 which possesses at least two twin planes 8 and 9. The supercooling and the liberating heat of crystallization enter into equilibrium and there results in the vicinity of the crystal seed the temperature distribution schematically shown in FIG. 3, which is symmetrical to the broad sides of the seed crystal. The isotherms indicated in FIG. 3 correspond to respective temperatures $T_1$, $T_2$, $T_3$ and $T_4$, which while not identical with the respective temperatures $T_1$, $T_2$ and $T_3$ as indicated in FIGS. 1 and 2, are however, likewise interrelated in accordance with $T_1<T_2<T_3<T_4$, wherein $T_1$ is a temperature below the melting point of the semiconductor material. This temperature distribution causes the growth of a plate dendrite whose cross section, as exemplified in FIG. 4, has an H-shape. The interstices denoted by 12 and 13 subsequently become filled during the crystal pulling operation. Relative to this subsequent and more slowly growing insertion of semiconductor material into the interstices, however, the segregation coefficient of the impurities contained in the melt differs from that of the first-grown dendrite of H-shaped cross section. Consequently, there occur p-n or similar junctions in the subsequently grown material, which junctions are detrimental because they are not reliably, if at all, reproducible.

It is, therefore, a more specific object of our invention to avoid this type of crystalline growth, which mainly comes about by thermal conditions since the departure from the thermal equilibrium is essential for the rapid dendritic growth. In essence, our invention achieves the desired result by reversing the temperature distribution in comparison with that which ordinarily adjusts itself in the above-described manner. Such a reversal in temperature distribution can be carried out in a particularly simple manner in conjunction with a crucible-free dendrite pulling method of the type disclosed in the above-mentioned copending application Serial No. 139,400, because this process permits subjecting the melt to supercooling from the outside.

For that reason, the invention will be described presently with preferred reference to such a crucible-free dendrite pulling method, and, before dealing with the invention proper, a brief description will be presented of an apparatus, shown in FIG. 13, which is similar to the one illustrated and described in the copending application Serial No. 139,400, except for modifying features in accordance with the present invention.

Figure 13:
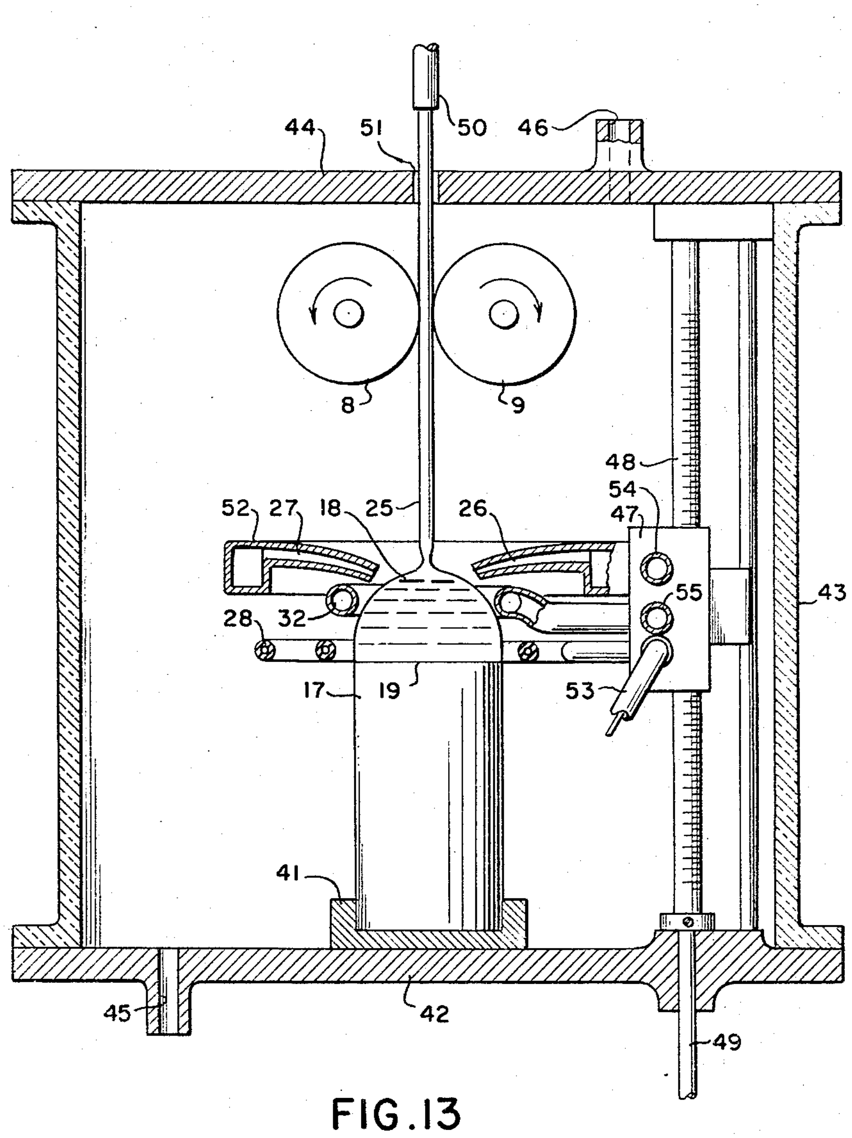
FIG. 13 shows partly in vertical section (schematically) a device exemplifying still another embodiment of the invention and that of copending application No. 139,400.

As shown in FIG. 13, a carrier body of semiconductor material, preferably silicon, constituting a relatively thick rod, is securely mounted in a holder 41 which is fastened to the base plate 42 of the apparatus. The peripheral wall 43 of the apparatus is closed at the top by a cover plate 44. The sealed processing space in the interior of the vessel is preferably filled with a neutral gas, for example argon, or with a reducing gas of good heat conductance, such as hydrogen. A gas, for example hydrogen, enters through an inlet nipple 45 and leaves the processing space through an outlet nipple 46. The gas flow can be utilized to regulate the cooling conditions of the melt to facilitate maintaining the temperature distribution still to be described. For this purpose, the gas may be supplied at normal room temperature and its flow rate then adjusted to the desired value.

The top portion 18 of the semiconductor body 17 is kept molten during operation of the apparatus by means of the heating device 28. In the illustrated embodiment the heating device comprises an induction coil 28 mounted on a carrier 47 which is displaceable along the rod axis by means of a screw spindle 48, which can be kept in rotation by means of an extension shaft 49 driven from outside of the processing chamber. In general, it is necessary to first preheat the top portion of the rod, for example by radiation from the outside in order to make it electrically conductive, whereafter the inductance heater coil 28 can be put into operation to bring the molten zone up to the necessary temperature and thereafter maintaining it at that temperature. If desired, a second coil may be located coaxially above the solid-to-liquid boundary of the rod in order to impose a levitating force upon the melting zone as is more fully described in the copending application Serial No. 139,400.

As shown, the molten portion 18 forms a mound on top of the solid portion of the rod 17. A crystalline tape 25 is continuously pulled out of the seed by means of a transporting device here shown to consist of two nipping rollers 8 and 9. The process is started by immersing a crystal seed 50 into the melt 18 and then pulling the seed slowly upwardly. For this purpose the cover plate 44 is provided with a central opening 51.

The top portion of the mound-shaped melt 18 is surrounded by a tubular short-circuiting coil 32 which is also attached to the carrier 47 in fixed relation to the heater coil 28 and is traversed by water or other coolant during operation. The short-circuiting field as well as the cooling action cause the melt to become cooler in the upper region than near the solid-to-liquid boundary schematically indicated at 19. Also shown in FIG. 13 are blow nozzles 26 and 27 which are mounted on a ring-shaped gas-supply conduit 52. This conduit is likewise attached to the holder 47 so that the nozzles 26 and 27 maintain a fixed position relative to the heater coil 28 and the short-circuiting coil 32. The carrier 47 is provided with a flexible cable 53 for supplying electric high-frequency current to heater coil 28 and is also provided with a nipple 54 for connection to a flexible hose for supplying gas to nozzles 26 and 27. Also shown is one of two nipples 55 for passing coolant through the tubular coil 32.

When the upper portion of melt 18 into which the semiconductor tape 25 is immersed, has a temperature in the supercooled region below the melting point, for example about 10° C. below the melting point of silicon in the present case, new material continuously grows onto the semiconductor tape 25 which is being continuously pulled out of the melt by the device 8, 9. In order that this continuous growth of tape 25 persists, new semiconductor material is continuously supplied to the melt. For this purpose, the carrier 47 is being displaced downwardly at such a speed that the amount of material thus melting from the body 17 into the melt is approximately equal to the quantity of material simultaneously being pulled out of the melt during the crystal-growing operation.

The tape 25 can be wound upon a spool or roll outside of the processing vessel. It will be understood that instead of moving the carrier 47 and the components mounted thereon, these components can be kept stationary and in lieu thereof the body 17 be moved upwardly at the rate required to keep the freezing boundary 19 substantially fixed in space.

FIG. 5 represents schematically the temperature distribution in a melt carried by a solid semiconductor body as exemplified by the device described above with reference to FIG. 13. FIG. 5 constitutes a cross section through the melting zone 18. The isotherms 14, 15 and 16 correspond to respective temperatures $T_3$, $T_2$ and $T_1$, whose interrelation is in accordance with $T_1 < T_2 < T_3$, wherein $T_3$ is the temperature below the melting point of the semiconductor material.

FIG. 6 shows schematically the same temperature distribution in a vertical section through the melt 18 on part of the semiconductor body 17 carrying the melt. The temperature of the melt in the vicinity of the liquid-to-solid boundary, denoted by 19, is kept above the melting point of the semiconductor material by means of a suitable heating device, for example the induction coil 28 in FIG. 13. By relative motion between the semiconductor body 17 and the heater device, continously new material is molten during the pulling of the dendrite. The entire upper portion of the molten mound is supercooled and possesses the illustrated temperature distribution, again corresponding to the relation $T_1 < T_2 < T_3$, and the condition that $T_3$ is below the melting point of the semiconductor material. If a dendritic crystal seed is immersed into the middle of such a supercooled drop, then the crystal commences a rapid growth. The heat of crystallization being liberated causes a temperature distribution to be built up as is characterized by the isotherms 21 and 22 in FIG. 7. This distribution enters into equilibrium with the temperature distribution previously obtaining in the melt prior to the crystal pulling operation. As is apparent from FIG. 7, the melting heat can more rapidly reach the surface of the melt at the narrow sides 23 and 24 of the dendritic crystal, than the broad sides. As a result, the already existing temperature gradients are still further increased.

The tape-shaped semiconductor body pulled by a method according to the invention then assumes a cross section as exemplified in FIG. 8.

In the embodiment of means for performing the method of the invention, shown in FIG. 9, the semiconductor 17 supporting the melt 18 is displaceable in the direction of the arrow 30. As explained above, the semiconductor body may also be kept fixed and the heating and cooling components of the device may move accordingly. Means for controlling the relative movement is described in copending application of W. Spielmann, Serial No. 178,746, filed on March 9, 1962, and having a common assignee as the instant application. By means of the induction coil 28, the melt 18 is heated above the melting point of the semiconductor material in the vicinity of the liquid-to-solid boundary 19. During pulling the tape-shaped semiconductor body 25 in the direction of the arrow 29, a flow of coolant from nozzles 26 and 27 is directed onto the melting zone. Although only two nozzles are shown, a larger number are preferably provided and are uniformly distributed about the upper portion of the melting zone 18. As a result, the temperature distribution explained above with reference to FIGS. 5, 6 and 7 is enforced.

Such a temperature distribution can also be secured by placing the semiconductor body into a preferably flowing atmosphere of an inert gas of relatively good heat conductance, as is exemplified by the above-described apparatus shown in FIG. 13. It is also of advantage to mount a cooling coil 31 as shown in FIG. 10 above the heating device, for example the induction coil 28, that serves for melting the material of the carrier body 17.

According to the instant invention, a particularly steep temperature gradient is produced perpendicularly to the narrow sides of the seed crystal and of the dendritic tape growing onto the seed crystal, this being done in addition to the above-mentioned ways of maintaining the inversion in temperature gradients for example by means of a flow of a heat-conducting gas or by blowing a cooling gas from nozzles against the upper portion of the melt. For this purpose, a short-circuiting ring can be mounted above the induction coil. Such a short-circuiting ring is shown at 32 in FIGS. 11 and 13 the latter of which pertains to the present invention only when using features of FIGS. 11 and 12. The field produced in the melt by the short circuit in ring 32 weakens the effect of the inductive field produced by the coil 28 and thereby prevents the induction coil 28 from heating the top portion of the melt as much as the lower portion. The short-circuiting ring, for the purposes of the invention, has the shape illustrated in FIG. 11. It is particularly advantageous to cool the short-circuiting ring 32, for example by forming it from copper tubing and passing liquid coolant for example water through the ring. It will be noted that according to FIG. 11 the short-circuiting coil 32 comes close to the narrow edges of the seed crystal or dendrite but remains relatively remote from the broad sides. By virtue of this shape of the short-circuiting ring, the heating field of the induction coil 28 (not illustrated in FIG. 11) is more strongly weakened at the narrow sides 23 and 24 of the crystal 7 being pulled than at the broad sides thereof. This effect is promoted by the above-mentioned cooling of the short-circuiting ring. This type of short-circuiting ring is particularly favorable because under the conditions just mentioned, the heat of crystallization that becomes liberated when the semiconductor material grows onto the seed crystal or dendrite during the pulling operation, passes at a particularly rapid rate from the edges (narrow sides) to the surface of the melt thus still increasing the already present temperature gradient.

Such an increase in temperature gradient at the narrow sides of the growing crystal can also be obtained with the aid of a device according to FIG. 12 showing the melt from above. Two nozzles 33, 34 are placed close to the narrow sides 23 and 24 of the seed or dendrite above the induction coil 28 (not shown in FIG. 12). Consequently, these nozzles serve to additionally cool the narrow sides. Since the broad sides are less intensively cooled, the already present temperature gradient is still further increased as explained above in conjunction with FIG. 11.

A particularly steep temperature gradient perpendicular to the narrow sides of the crystal seed or of the dendrite tape growing onto the seed can also be secured in a simple manner with a device according to FIG. 9 by giving the nozzles at the narrow sides a larger nozzle opening than at the nozzles located at the broad sides of the dendrite.

While specific reference has been made to silicon, it is obvious that the process is equally applicable to other semiconductor materials, such as germanium or $A^{III}B^{V}$ compounds, as defined by Welker in U.S. Patent No. 2,798,989. Sliicon melts at 1420° C. and is supercooled by about 10° C. during the pulling operation. The supercooling for other semiconductor material is also in the order of about 10° C.

We claim:

1. The process of producing a long, particularly tape-shaped, dendritic semiconductor body, which comprises the steps of producing a crucible-free dome-shaped melt of semiconductor material on top of an upright carrier of the same material by heating the top of said carrier, maintaining a portion of the melt adjacent said carrier at a temperature above the melting point of the semiconductor material, inserting an elongated dendrite crystal seed into the belt, supercooling a region of the melt around said seed, pulling said seed from said melt with growing dendrite adhering thereto in the form of a tape having broad and narrow sides, providing and maintaining a cooling effect on the narrow sides of the dendrite tape in the region of the interface substantially greater than the cooling effect adjacent the broad sides of said tape.

2. The process of producing a long, particularly tape-shaped, dendritic semiconductor body, which comprises the steps of producing a crucible-free dome-shaped melt of semiconductor material on top of an upright carrier of the same material by heating the top of said carrier by a high-frequency coil, maintaining a portion of the melt adjacent said carrier at a temperature above the melting point of the semiconductor material, inserting an elongated dendrite crystal seed into the melt, supercooling a region of the melt around said seed by a short-circuiting ring, pulling said seed from said melt with growing dendrite adhering thereto in the form of a tape having broad and narrow sides, said short-circuiting ring being elliptical thereby providing and maintaining a cooling effect on the narrow sides of the dendrite tape in the region of the interface substantially greater than the cooling effect adjacent the broad sides of said tape.

3. The process of producing a long, particularly tape-shaped, dendritic semiconductor body, which comprises the steps of producing a crucible-free dome-shaped melt of semiconductor material on top of an upright carrier of the same material by heating the top of said carrier by a high-frequency coil, maintaining a portion of the melt adjacent said carrier at a temperature above the melting point of the semiconductor material, inserting an elongated dendrite crystal seed into the melt, supercooling a region of the melt around said seed by cooling gas, pulling said seed from said melt with growing dendrite adhering thereto in the form of a tape having broad and narrow sides, directing a stream of cooling gas in the region of the interface to provide and to maintain a cooling effect on the narrow sides of the dendrite tape in the region of the interface substantially greater than the cooling effect adjacent the broad sides of said tape.

References Cited by the Examiner

UNITED STATES PATENTS

| | | | |
|---|---|---|---|
| 2,999,737 | 9/1961 | Siebertz | 23—273 X |
| 3,031,403 | 4/1962 | Bennett | 23—301 |
| 3,096,158 | 7/1963 | Gaule et al. | 23—301 X |
| 3,124,489 | 3/1964 | Vogel et al. | 23—301 X |
| 3,129,061 | 4/1964 | Dermatis et al. | 23—301 X |
| 3,136,876 | 6/1964 | Crosthwait | 23—301 X |
| 3,157,472 | 11/1964 | Kappelmeyer | 23—301 X |
| 3,192,072 | 6/1965 | Ziegler et al. | 23—301 X |

FOREIGN PATENTS

| | | |
|---|---|---|
| 1,235,341 | 5/1960 | France. |

NORMAN YUDKOFF, *Primary Examiner.*

G. P. HINES, *Assistant Examiner.*